June 2, 1970  H. EVERS  3,514,812
APPARATUS FOR MOLDING HOLLOW ARTICLES
Filed July 11, 1967  5 Sheets-Sheet 1
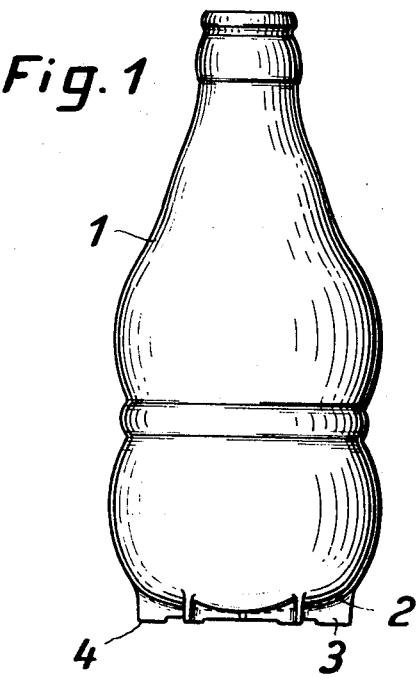
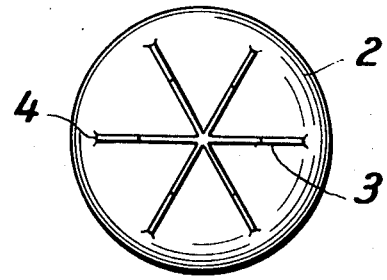
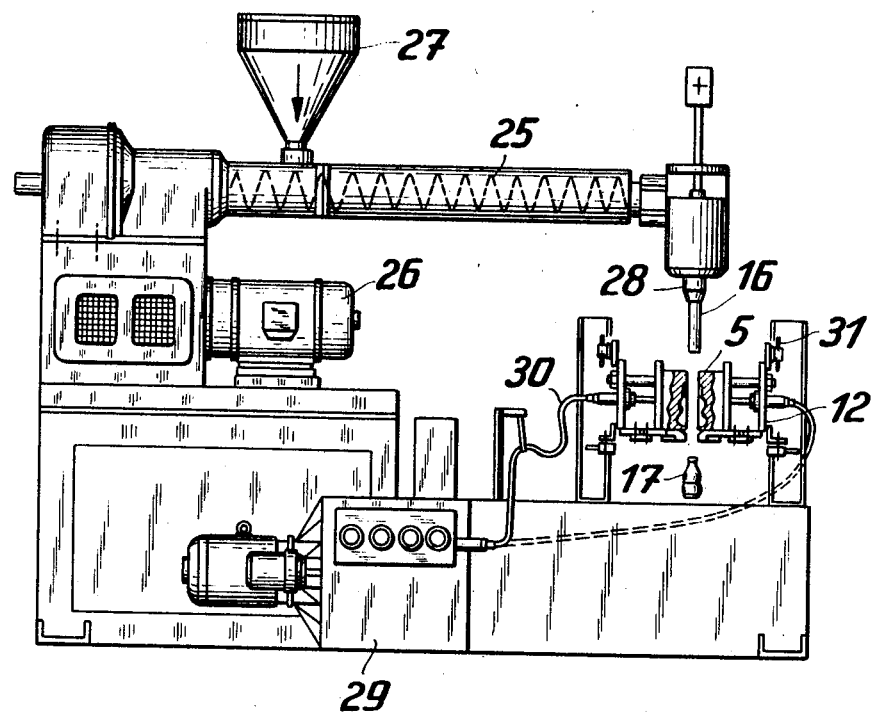
INVENTOR
HEINZ EVERS
BY
Beaman + Beaman
ATTYS.

INVENTOR
HEINZ EVERS
BY
Beaman + Beaman
ATTYS.

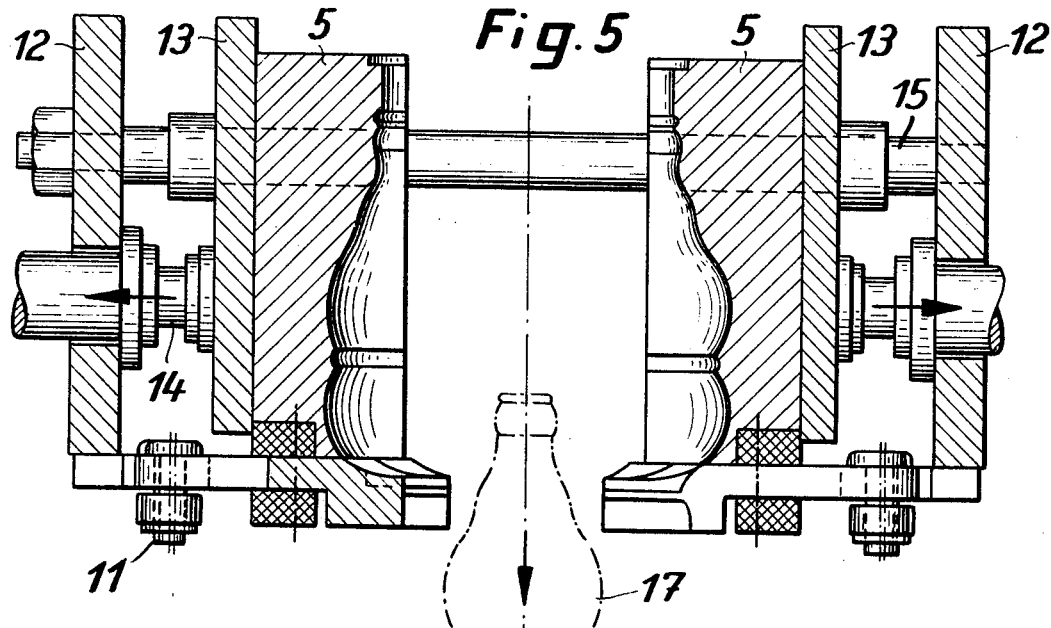
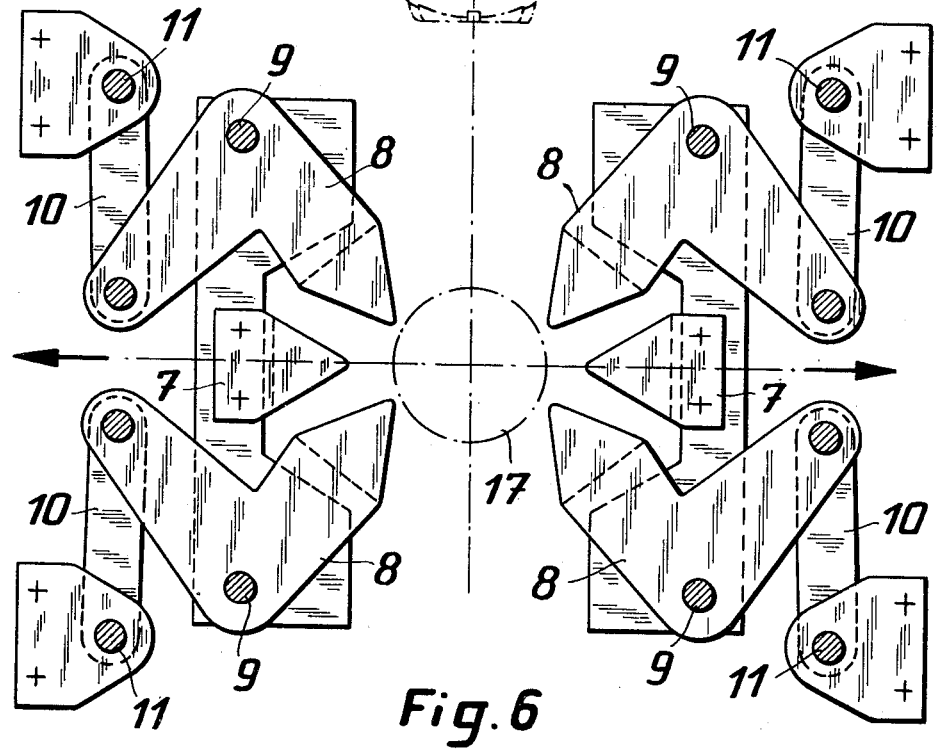

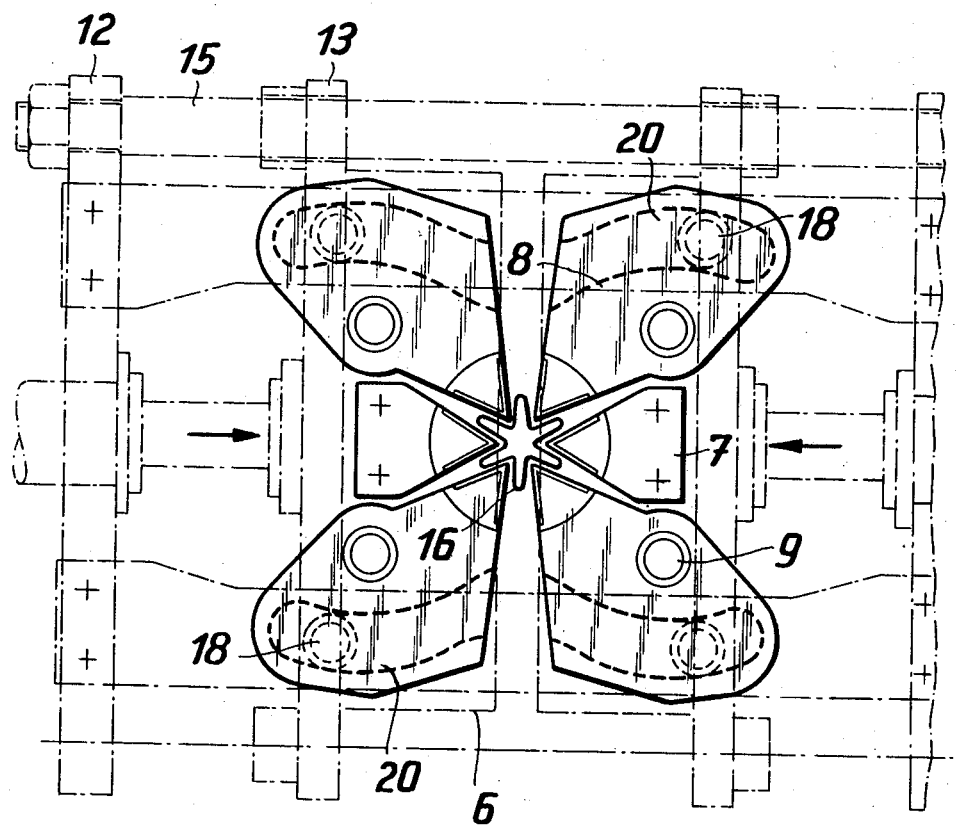

June 2, 1970            H. EVERS            3,514,812
APPARATUS FOR MOLDING HOLLOW ARTICLES
Filed July 11, 1967            5 Sheets-Sheet 5

INVENTOR
HEINZ EVERS
BY
Beaman + Beaman
ATTYS.

United States Patent Office 3,514,812
Patented June 2, 1970

3,514,812
APPARATUS FOR MOLDING HOLLOW ARTICLES
Heinz Evers, Hamburg, Germany, assignor to Interstabella AG, Chur, Switzerland
Filed July 11, 1967, Ser. No. 652,521
Claims priority, application Germany, Ju'y 12, 1966,
E 23,705; Nov. 29, 1966, J 32.360
Int. Cl. B29c 17/07; B29d 23/03
U.S. Cl. 18—5                                    8 Claims

ABSTRACT OF THE DISCLOSURE

The apparatus for making bottles for pressurized liquids, especially for beer, from an extruded hose of plastic comprising a multipart, preferably a two-part blow mold and a bottom mold. The bottom mold consists of at least three, preferably six, bottom mold sector portions, which can be moved radially to and from a point on the longitudinal center axis of the hose. With the movement of the sector portions to the center axis the hose is squeezed together and a bottom with star-shaped welding seams and outwardly projecting ribs is formed. The ribs result from the squeezing operation and may serve as a base for the bottle which is outwardly vaulted at its underside.

BACKGROUND OF INVENTION

Hollow articles of plastic are in part made by a combined extrusion and blowing method. In this method, a hose of plastic is extruded which is seized by a bipartite mold while still in a plastic condition. After the so-called blow mold has been completely closed, compressed air is blown into the hose so that the plastic hose swells and adopts the shape of the blow mold. When the blow mold is closed, the bottom of the bipartite mold squeezes together the plastic hose at its lower end thereby mash welding the hose along the squeezed seam. When the hose is squeezed together, it loses its circular cross section in the region of the squeezing-off and adopts an elongate oval-shaped cross section. From this a non-uniform distribution of the material in the region of the bottom of the hollow article results with the inflation of the hose into a round hollow article. This non-uniform distribution of plastic is caused by the fact that the plastic is considerably stronger stretched transversely of the squeezed seam than longitudinally thereof because a substantially larger wall area of the lower portion of the hollow article is to be formed from a hose portion in a direction transversely of the seam than from an equal hose portion in a direction longitudinally of the seam. This phenomenon results into considerable non-uniformities in the stress distribution when the bottom of the hollow article is loaded which has been shown amongst others by photoelastic isochromatic photographs taken with polarized light. This unfavourable stress distribution in connection with relatively brittle plastic such as hard PVC stabilized as necessary for use with foodstuffs, will result in breakage already under low loads.

SUMMARY OF THE INVENTION

In accordance with the invention, these drawbacks are overcome in that the bottom of the hollow article comprises at least three seam portions each formed of a squeezing fold. In this manner, the material is distributed essentially more uniformly about the bottom than before, whereby the additional stresses within the bottom are removed or at least considerably reduced. Thereby the durability of the bottle is considerably increased.

The invention may suitably be practised in such a manner that the bottom of the hollow article comprises at least three ribs each formed of a squeezing seam.

The invention is furthermore improved in that the bottom of the hollow article is vaulted outwardly and the squeezing folds remain in place as projecting webs. This construction is especially suited for bottles adapted to contain pressurized liquids or pressurized gases, for example beverages pressurized by carbon dioxide.

Suitably, these webs are designed to be plain at the bottom edges thereof and thus form a base because at least three such squeezing folds are available.

The device for making such a hollow article starts out from a multipart, in particular bipartite, blow mold, which, accordingly, consists of two blow mold halves adapted to be moved towards and from each other. In accordance with the invention with such a multiple blow mold there are provided at least three bottom mold sector portions for the formation of the bottom of the hollow article which sector portions squeeze off the extruded plastic hose and in this manner form the squeezing folds. Suitably, the squeezing folds are formed by the bottom mold sector portions approximately at the same time as the blow mold halves are closed. But it is also possible to form the squeezing folds by means of the bottom mold sector portions before the blow mold halves are closed or after the blow mold halves have been closed.

In accordance with the invention the bottom mold sector portions are arranged for uniform movement towards a point situated approximately in the longitudinal center axis of the hollow article and the hose. Preferably, the bottom mold sector portions form a star-shaped squeezed seam at the bottom of the hollow article, said sector portions remaining spaced from each other when in its finally closed positions by the thickness of the squeezed seam.

In a preferred embodiment of the invention, the bottom mold sector portions are movable in dependence upon the blow mold parts. But it is also possible to actuate the bottom mold sector portions hydraulically, pneumatically or even electro-hydraulically.

Further improvements and suitable embodiments of the invention will be shown by way of example in the accompanying drawing. This drawing shows diagrammatic views of some embodiments of the invention. In the drawing

BRIEF DESCRIPTION OF THE DRAWING

FIG. 1 shows a side view taken on a bottle formed in accordance with the invention, said bottle being particularly intended to receive carbon dioxide containing beverages, FIG. 2 shows a view taken on the bottle of FIG. 1 from below, FIG. 5 is a sectional view similar to that of FIG. 3, however, after completion of a blowing step at the moment when the blow mold and the bottom mold sector portions are completely opened, FIG. 6 is a sectional view corresponding to FIG. 4, however, in the position as shown in FIG. 5, FIG. 7 shows a sectional view corresponding to FIG. 4 taken on another embodiment of the invention to show a modification of the bottom mold sector portions, FIG. 9 shows a simplified partially sectional view of the extruder blowing machine suited to produce the hollow bodies according to the invention.

DESCRIPTION OF THE PREFERRED EMBODIMENTS

Figure 3:
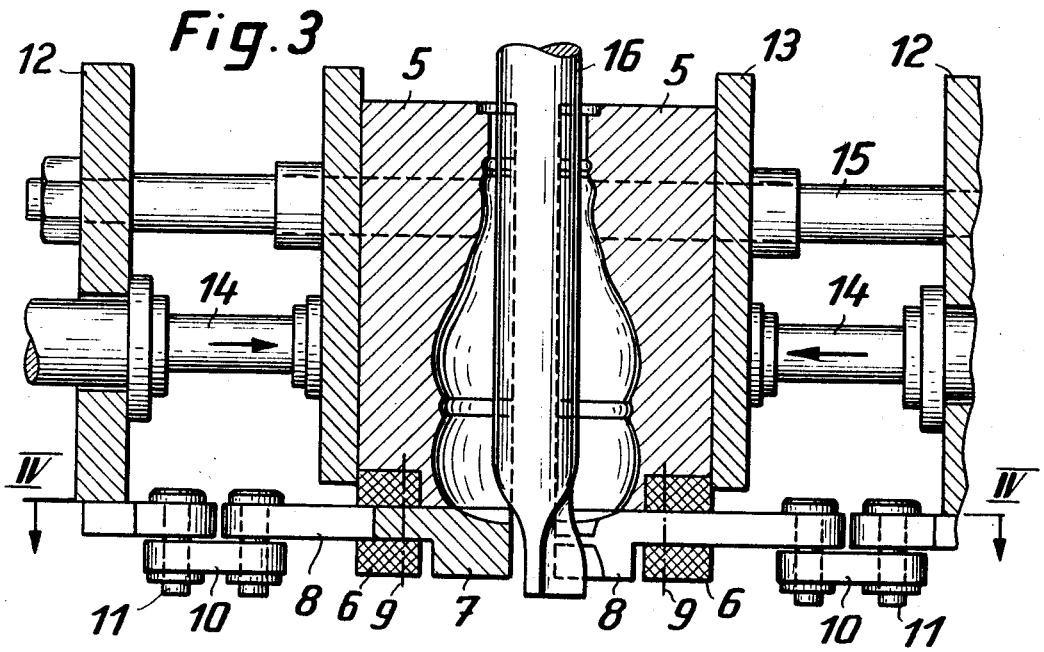
FIG. 3 shows a longitudinal sectional view taken on line III—III of FIG. 4 showing the bipartite blow mold and the bottom mold for manufacturing the bottle according to FIGS. 1 and 2 with those parts of the blowing machine not belonging to the invention eliminated, and in the working condition during the closing step.
Figure 4:
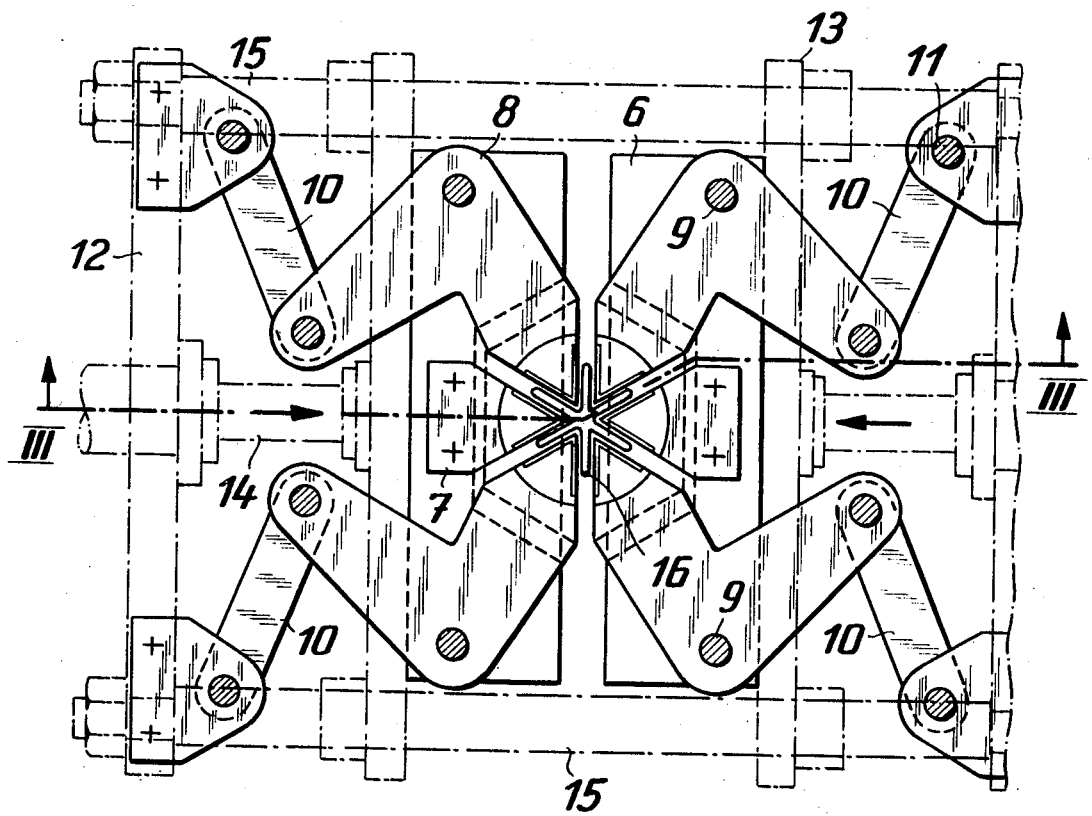
FIG. 4 shows a cross sectional view taken on line IV—IV of FIG. 3 through the bottom mold sector portions.

In accordance with FIGS. 1 to 2 the bottle wall 1 is formed with spherical zones to increase the compressive strength thereof while, likewise to increase the compressive strength, the bottom 2 is vaulted outwardly. The ribs 3 are formed from squeezed seams the bottom edges of which being arranged in a plane so that a star-shaped base 4 is produced. In accordance with FIGS. 3 to 6, the blow mold halves 5 to produce the shape of the hollow body are designed in a manner known per se. The bottom mold generally designated by 6, however, consists of six bottom mold sector portions, three of them supported on each blow mold half 5.

In the example of embodiment of FIGS. 3 to 6, two sector portions 7 are rigidly connected with the bottom mold and thus with the blow mold halves 5, while four sector portions 8 are pivotally supported about a bearing 9 and, when the mold halves are opened and closed, are turned by means of levers 10 in such a manner that the star-shaped squeezing-off of the hose results. The arrows in FIGS. 3 and 4 indicate the direction of the mold halves 5 and 6 during the closing movement of the mold. The fixed bearing 11 of the levers 10 are fastened at the stationary part of the blowing machine 12. The blow mold 5 is fastened together with the bottom mold 6 on displaceable mold carrier plates 13 in a manner known per se which to close the mold, are moved towards each other along guiding rods 15 by means of hydraulically or pneumatically actuated piston 14 or in some other manner.

In this operation, the bearings 9 of the movable sector portions 8 are moving along straight paths. The leverages of the sector portions 8 and the levers 10 are designed in accordance with the known kinematic principles so that a swinging movement of the sector portions 8 results in such a manner that the hose is seized simultaneously by the points of the fixed sector portions 7 and the movable sector portions 8 and, with the closing movement of the mold continued, is squeezed off in the shape of a star. It is clearly recognizable how, in the moment shown of the closing step, the plastic hose 16 of plastic has already been seized by the sector portions 7 and 8 of the bottom mold and the squeezing into the shape of a star has already begun, while that portion of the hose 16 which later on forms the wall 1 of the bottle is still freely suspended and is not yet seized by the wall mold. After the blow mold has been completely closed the hose 16 of plastic is enclosed by the neck portion of the blow mold. The shaping of the plastic hose 16 results from blowing compressed air into the mold in a manner known per se until the hose contacts the mold wall in the mold half 5. Usually the blow mold is cooled, but for simplification of the drawings the water cooling equipment of the wall mold 5 and the bottom mold 6 with the sector portions 7 and 8 are not shown.

FIGS. 5 and 6 show the blow mold at another moment of the working cycle, namely the position of the individual parts at the moment the blow mold is completely opened after completion of the blowing operation. FIGS. 5 and 6 show that at this moment the bottom mold sector portions are spread from each other and are ready for the next closing operation. The mold portions have opened to such an extent that the finish-blown bottle 17 may drop downwardly from out of the mold.

Figure 8:
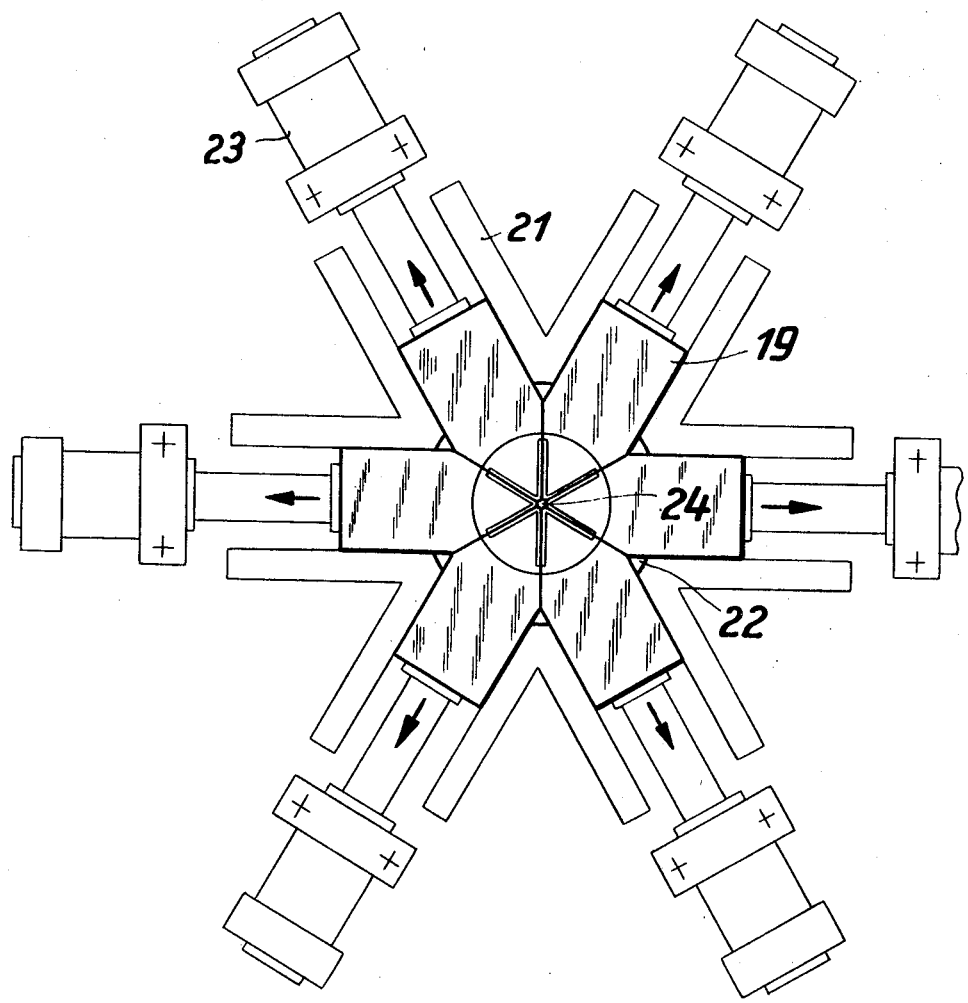
FIG. 8 is a plan view of the bottom mold sector portions taken from below and showing a modified embodiment of the invention.

In the embodiment in accordance with FIGS. 7 and 8, bottom mold sector portions are likewise provided again. The bottom mold sector portions 7 are disposed in the center each being in conformity with the corresponding sector portions of the embodiment according to FIGS. 3 to 6. The actuation of the movable sector portions 8 of the embodiment according to FIG. 7, however, differs slightly from the actuation of the movable sector portions of the embodiment according to FIGS. 3 to 6. In accordance with FIG. 7, the movable sector portions 8 are provided with control cams or control grooves 20, which are in engagement with guide pins or guide rollers 18 fastened at the stationary frame of the automatic blowing machine. By this arrangement, the bottom mold sector portions 6 are forced to rotate about their bearings 9 fastened at the blow mold halves, when the latter are displaced with respect to the stationary frame, thereby performing simultaneously a straight-lined movement together with the blow mold halves 6, so that altogether a movement of the sector portions 8 is taking place which leads to a squeezing-off of the plastics hose in the bottom region of the hollow article with utmost uniformity.

In accordance with FIG. 8, the entire bottom mold 21 consists of six sector portions 19 with six guiding paths for their guidance uniformly arranged and distributed annularly about the periphery thereof. The bottom mold is arranged below the bipartite blow mold and is provided with a central opening of such a size that the extruded hose of plastics may pass through said opening before it is squeezed off. Each bottom mold sector portion may be moved towards a point 24 by a hydraulically or pneumatically actuated piston arranged in a cylinder 23, said point 24 being situated on the longitudinal center axis of the extruded plastics hose and the hollow article. Care has to be taken that the individual sector portions 19 are uniformly moved towards said point 24 by the pistons of the cylinders 23. This purpose is attained for example by having the bottom mold sector portions 19 perform their closing movements against a relatively great counter-acting force in comparison with which the resistances towards movement of the individual bottom mold sector portions are low. This great counteracting force may be generated for example by springs or by allowing the fluid of the working cylinder 23 to slowly exhaust from that side of the piston which is not pressurized for the closing movement of the sector portion.

There are numerous other possibilities of actuating the bottom mold sector portions in accordance with the invention. One may, for example, form all the undersides of the sector portions together in the shape of a cone and can push a hollow cone or a ring under these sector portions radially spread apart by springs, whereby the sector portions are led radially together and a uniform contact pressure between all the sector portions is attained when forming the squeezing folds. It is also possible to guide the bottom mold sector portions together like an iris diaphragm actuation. Moreover, one may also actuate the bottom mold sector portions like the dies of lathe chucks. In this case the bottom mold sector portions are lying radially displaceably in a fixed annular member and are each provided with a thread which cooperates with a plain thread provided on a rotatable disc. The disc provided with a plain thread may—if desired or required—be actuated in response to the to and fro movement of the blow mold halves.

FIG. 9 shows by way of example in a simplified manner an extrusion blowing machine suited to practice the invention. The machine comprises an extrusion press 25 driven by an electric motor 26 and plasticizing the plastic introduced at 27 in the form of a powder or a granulated material.

This softened plastics is extruded in a tubular shape through a deflection head with extrusion die 28 and supplies the hose 16 of hot plastic which is necessary to make the bottles. The plastics hose is seized by both mold halves 5 as has been described in detail in the foregoing description of the invention.

These mold halves 5 belong to the blowing machine and are hydraulically moved towards each other in the closing step and moved away from each other in the opening step. A hydraulic unit 29 generates the necessary oil pressure which is transferred to the hydraulic pistons of the blowing machine through a hose indicated at 30.

The pertaining hydraulic cylinders are fastened at the stationary part 12 of the blowing machine. This part 12, however, is stationary only with respect to the blow mold 5. It moves vertically with respect to the drawing plane together with the blow mold portions and the hose suspended therein along gliding paths 31 after the blow mold have been closed, and guides the blow mold to a place below a blowing mandrel not shown here. Through this mandrel, air is blown into the hose, so that the wall of the hose is forced against the mold walls of the mold halves and thus forms the bottle.

After the bottle has been cooled, the mold is opened hydraulically and the bottle 17 drops from out of the mold. The opened mold halves 5 are again moving to a point below the extrusion die 28 along the gliding path 31 together with the parts 12 which are relatively fixed with respect to the mold halves, the hose 16 having meanwhile been further extruded through the extrusion die 28 and just having the proper length for the formation of the next bottle. The mold halves are again closed thereby seizing the hose for the next working cycle.

Before the blow mold is transferred to the blowing mandrel, the hose is severed between the extrusion die and the blow mold, for example, by means of a red-hot wire.

What I claim is:

1. An apparatus for making hollow articles, such as bottles, from an extruded hose of thermoplastic material comprising, in combination, a multipart blow mold having portions adapted to be moved toward and away from each other for enclosing a thermoplastic hose prior to the hose being inflated into engagement with the mold for forming after the mold has been closed, said blow mold comprising two blow mold halves, three bottom mold section portions arranged below said blow mold and adapted to be moved uniformly towards and from a point situated approximately on the longitudinal center axis of said hose thereby in the closing movement sealing the end of the hose and forming a bottom portion, the bottom mold sector portions being movable in response to the blow mold halves, a bottom mold sector portion rigidly affixed to each blow mold half, and two bottom mold sector portions movably supported on each blow mold half symmetrically on both sides of said rigidly fastened sector portion, and blowing means for blowing air into the hose at the end opposite to the closed tube hose end.

2. An apparatus according to claim 1, wherein the bottom mold sector portions movably supported at each blow mold half are actuated by toggle joints having a fixed bearing at the stationary part of the apparatus and a pivot guided on a straight-lined path by being supported on the movable blow mold half.

3. An apparatus according to claim 1, wherein the bottom mold sector portions movably supported at each blow mold half are provided with guiding means adapted to control the closing and opening movement of said sector portions.

4. An apparatus according to claim 3, wherein said guiding means consist of control slots formed in said bottom mold sector portions, said slots being in engagement with guide pins fastened at the stationary part of the apparatus.

5. An apparatus for manufacturing bottles of plastics, comprising a two-part blow mold the halves of which being adapted to be moved towards and from each other and to enclose an extruded plastics hose for its blowing up into the bottle shape after the mold has been closed, one bottom mold sector portion rigidly fastened to each blow mold half, two bottom mold sector portions movably supported on each blow mold half and arranged symmetrically on both sides of the rigidly fastened sector portion, said movably supported sector portions being actuated by toggle joints with a fixed bearing at the stationary part of the apparatus and a pivot guided on a straight-lined path by being supported on the movable blow mold half, whereby all six bottom mold sector portions are moved substantially radially to and from a point situated approximately on the longitudinal center axis of the bottle when the blow mold halves are moved to and from each other, respectively.

6. Apparatus for making hollow articles, such as bottles, from a thermoplastic tube by blow molding comprising, in combination, a mold having a longitudinal axis and axially spaced first and second portions, means for axially introducing a thermoplastic tube into said mold along said axis into alignment with said mold portions, said mold comprising a plurality of sector segments radially movable toward and away from said axis defining a complete mold when radially moved the maximum extent toward said axis, means connected to said mold segments for radially moving said segments with respect to said axis, a plurality of spaced bottle base forming elements defined on said mold first portion forming radially extending ridges on the formed bottle, said second mold portion defining a bottle body, and means for inflating said tube upon said tube being located within said mold.

7. Apparatus for making hollow articles as in claim 6 wherein said base forming elements define said mold first portion and are separate from said sector segments defining said mold second portion, and said means connected to said segments for moving said segments comprising first means connected to said elements forming said mold first portion and second means connected to said segments forming said mold second portion.

8. Apparatus for making hollow articles as in claim 7 wherein said base forming elements are spaced from each other when said elements are disposed in their operating position nearest said axis wherein portions of said tube are recived between adjacent elements to define radially extending ridges upon said tube.

References Cited

UNITED STATES PATENTS

| | | |
|---|---|---|
| 2,503,171 | 4/1950 | Power. |
| 3,226,909 | 1/1966 | Von Zelewsky et al. |
| 3,390,426 | 7/1968 | Turner et al. _____ 18—5 |

WILBUR L. McBAY, Primary Examiner

U.S. Cl. X.R.

264—94